Oct. 13, 1942.  S. L. G. KNOX  2,298,704
INDUSTRIAL CONVEYER SYSTEM
Filed May 1, 1939  7 Sheets-Sheet 2
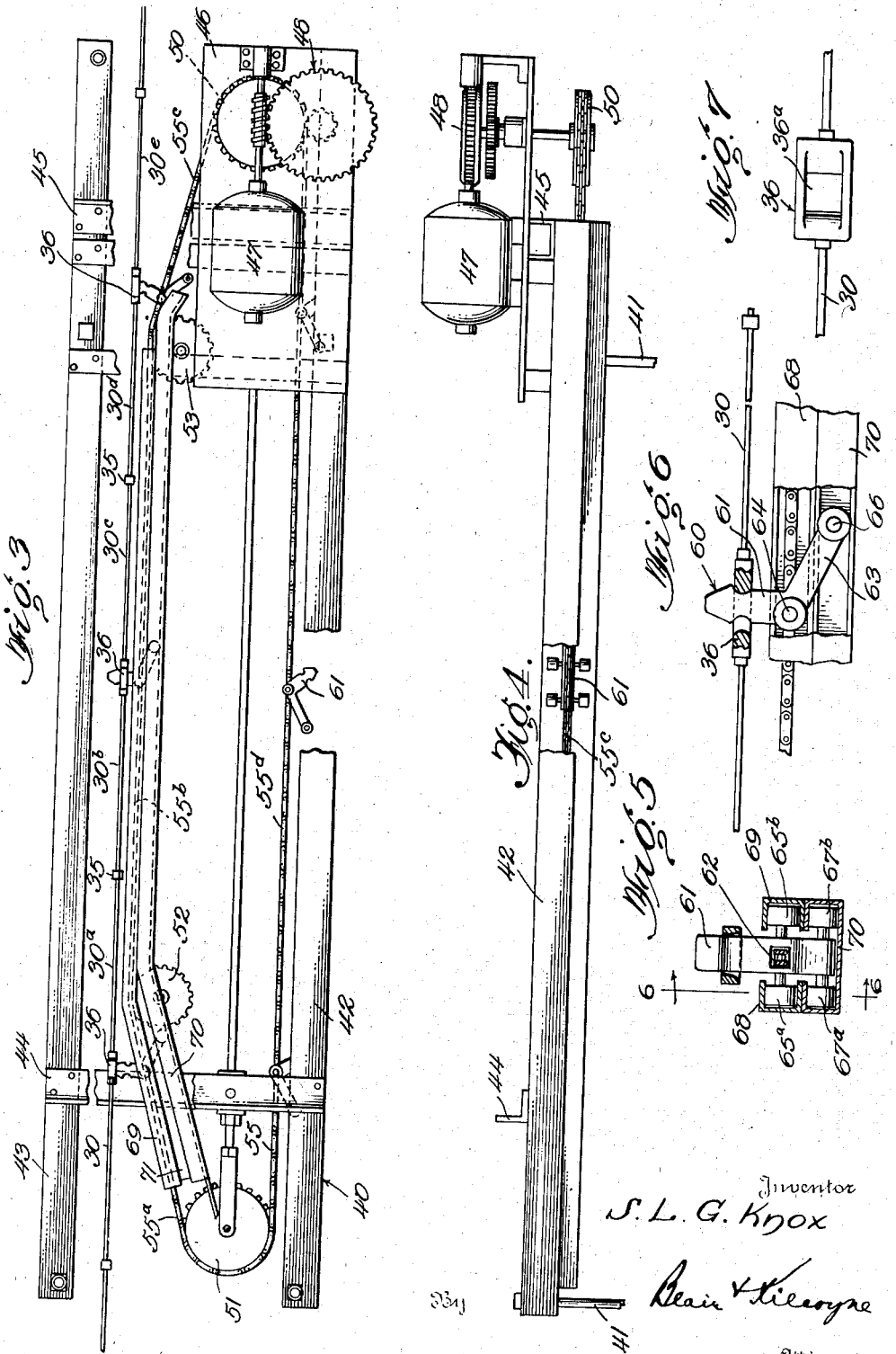
Inventor
S. L. G. Knox
Blair & Kilcoyne
Attorneys

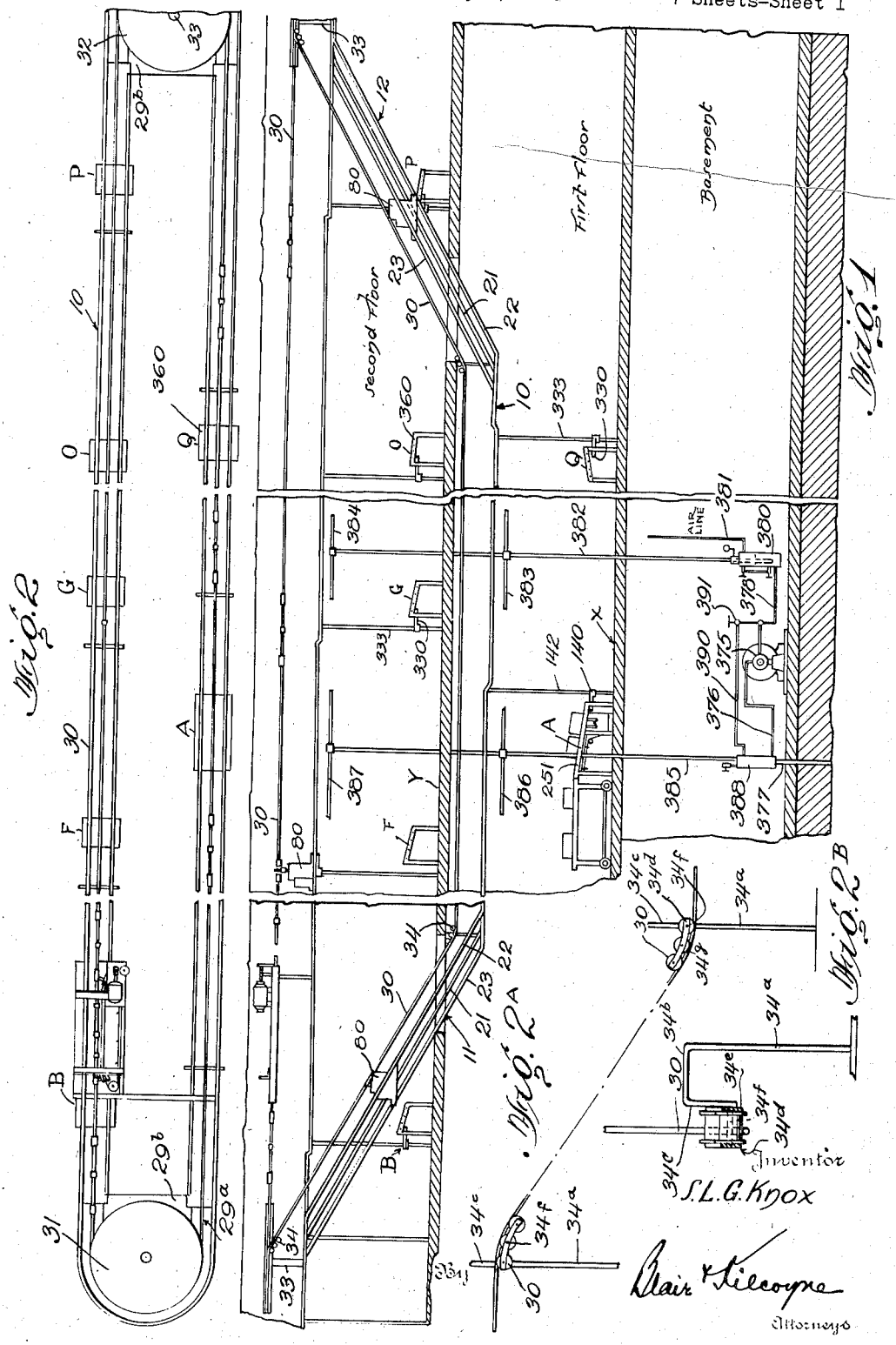

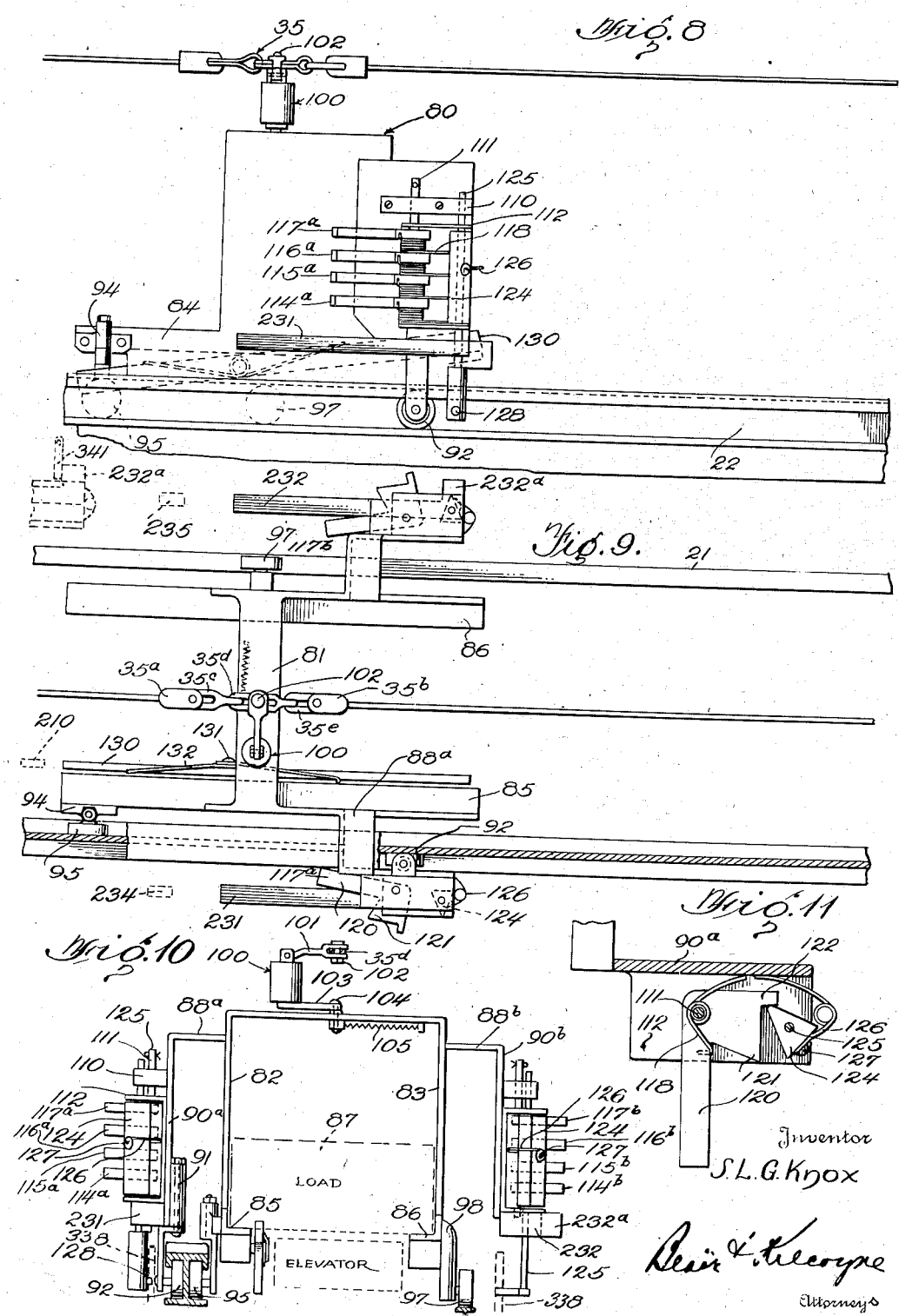

Oct. 13, 1942.  S. L. G. KNOX  2,298,704
INDUSTRIAL CONVEYER SYSTEM
Filed May 1, 1939  7 Sheets-Sheet 4
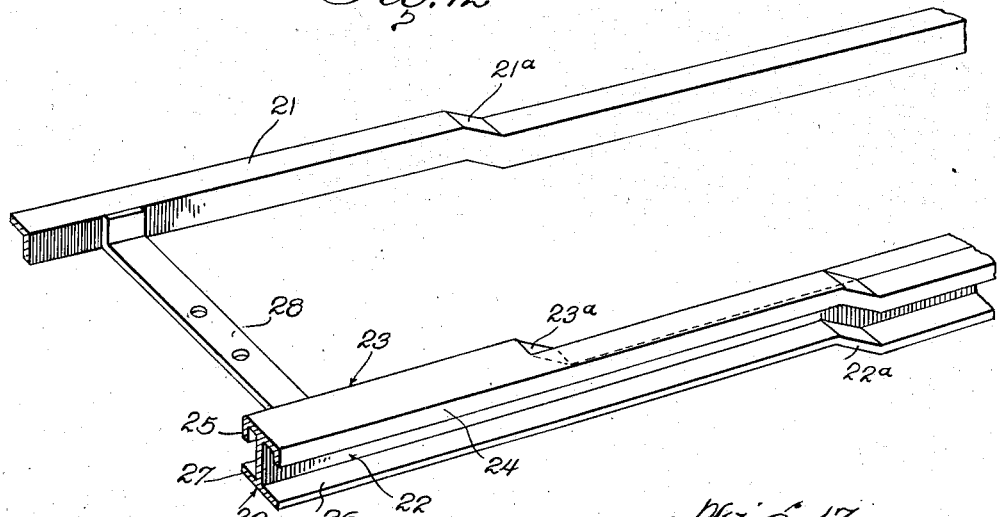
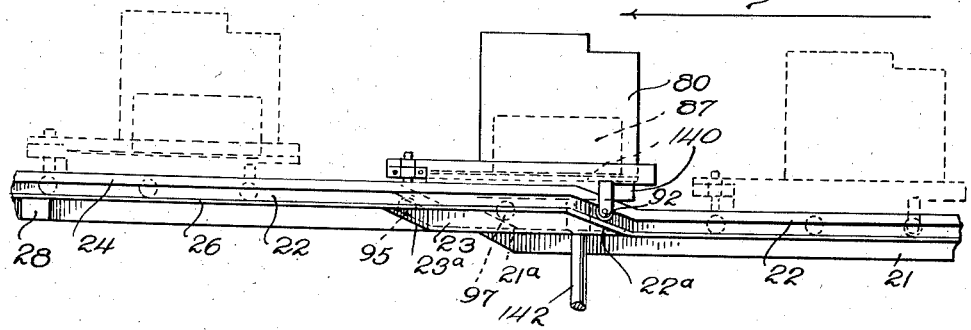
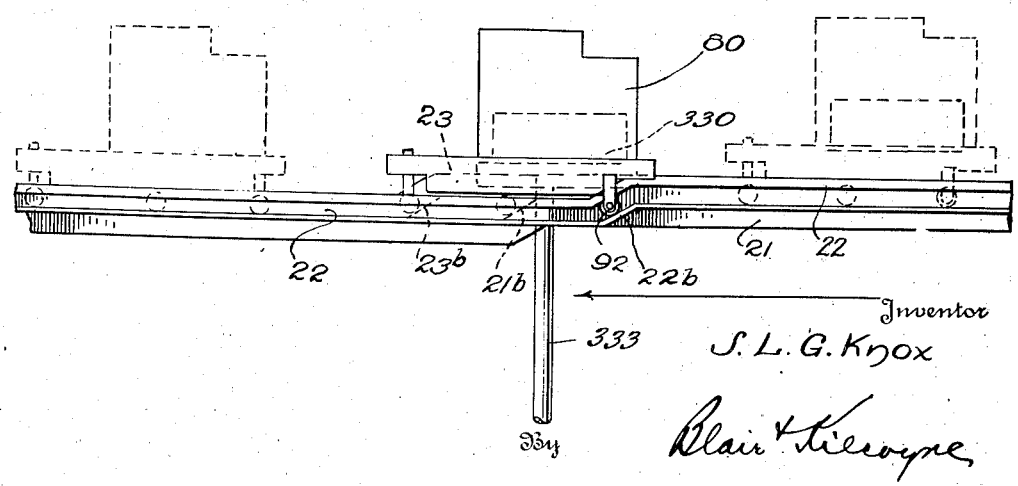
Inventor
S. L. G. Knox

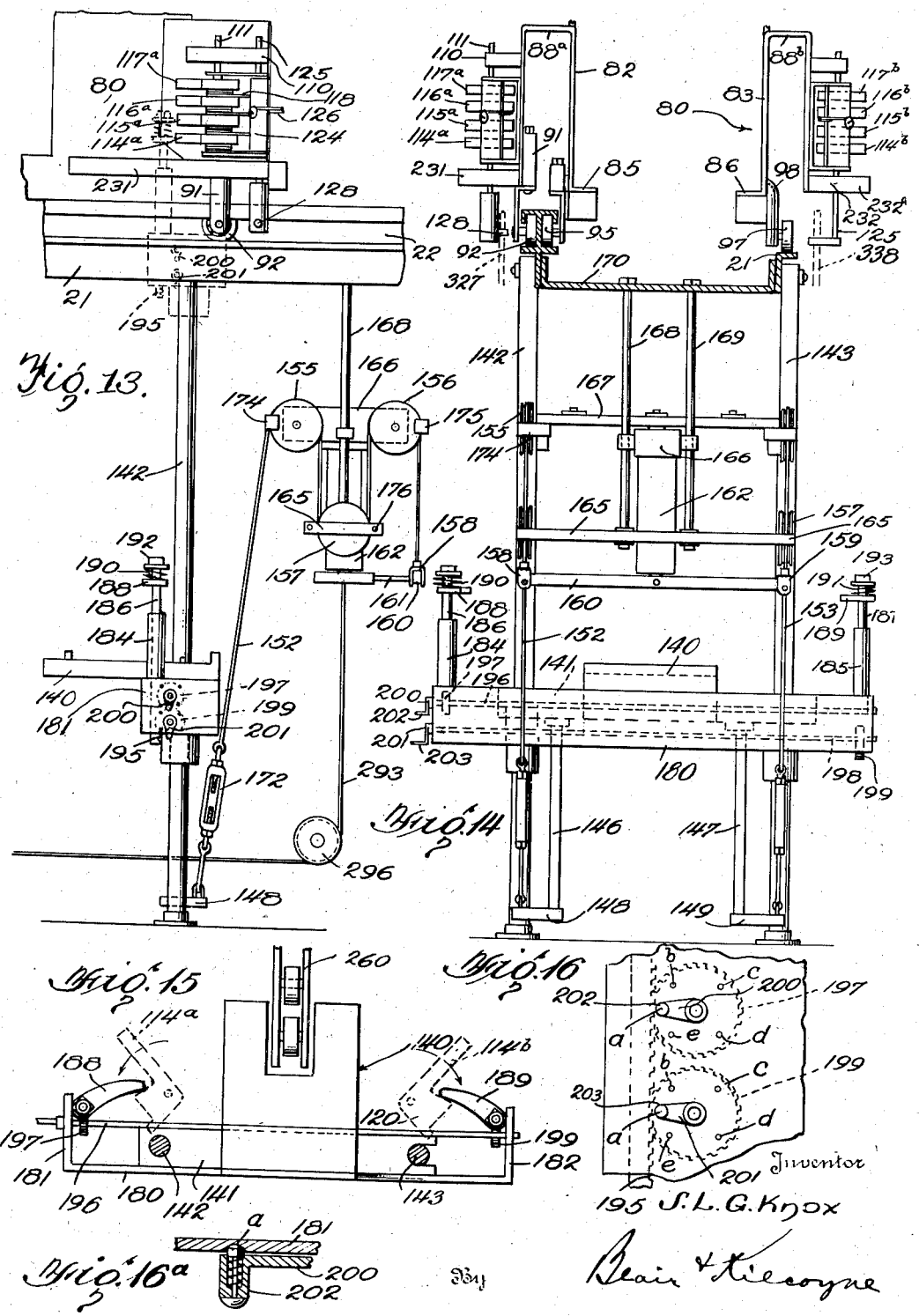

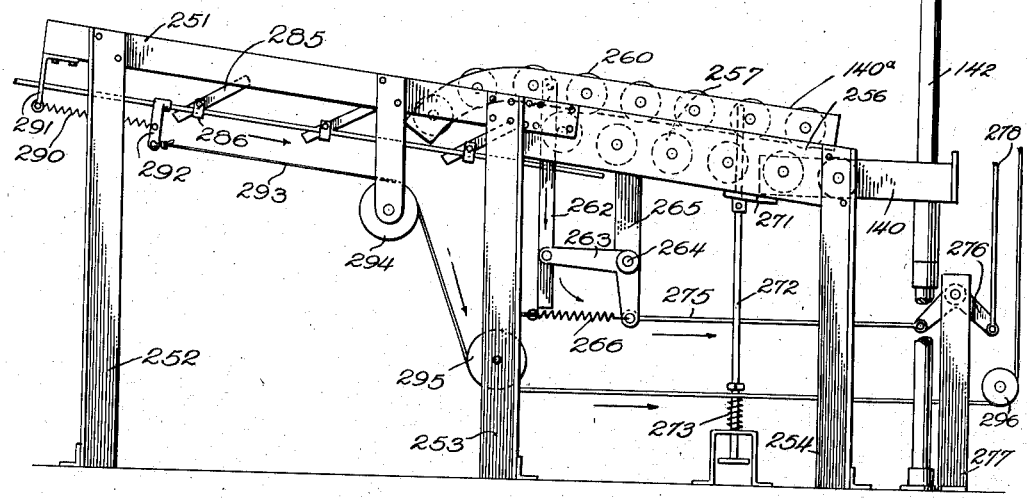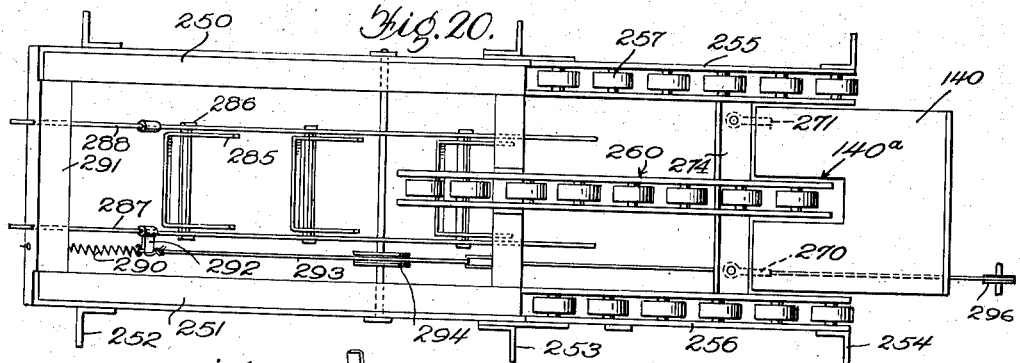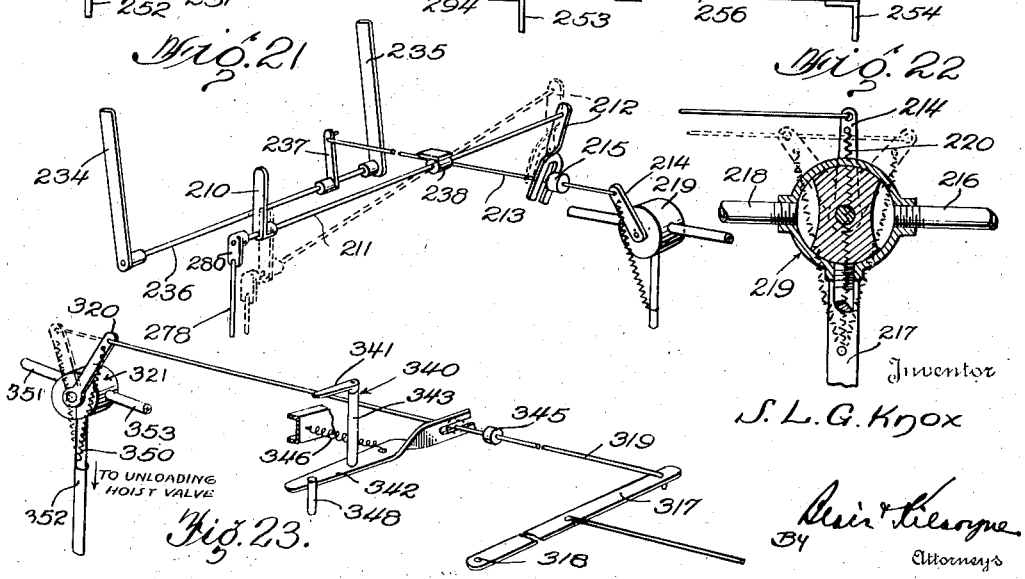

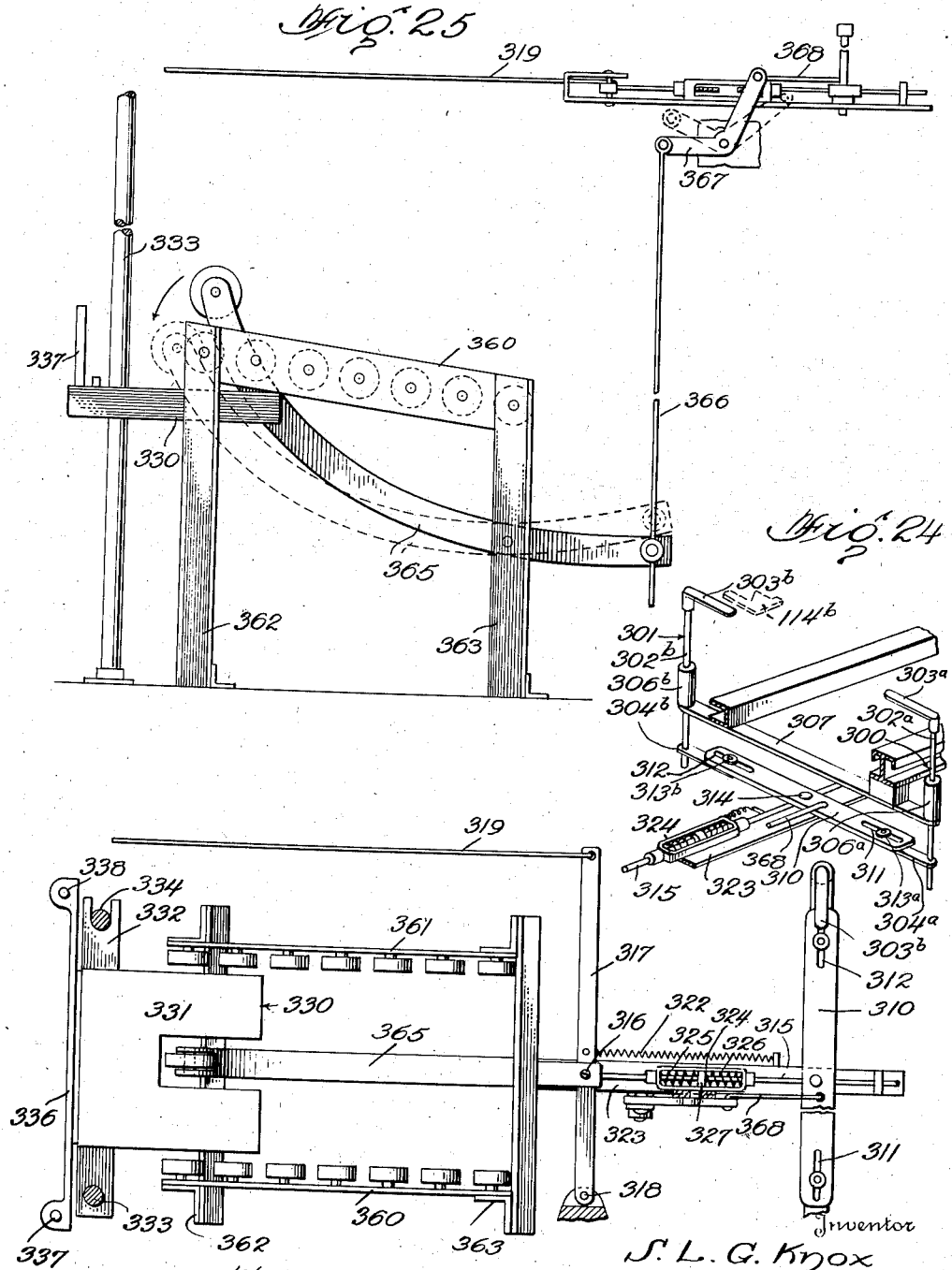

Patented Oct. 13, 1942

2,298,704

UNITED STATES PATENT OFFICE 2,298,704

INDUSTRIAL CONVEYER SYSTEM

Samuel Lippincott Griswold Knox, Englewood, N. J., assignor to Lamson Corporation, Syracuse, N. Y., a corporation of New York Application May 1, 1939, Serial No. 271,138

17 Claims. (Cl. 214—11)

This invention relates to industrial conveyer systems and in its more specific aspects to conveyer systems for picking up automatically and conveying loads from a plant distributing point, hereinafter referred to as a loading station, to any one of a plurality of unloading stations at which the load or loads are automatically deposited.

The invention contemplates and has for one of its main objects a load conveying and distributing system which is characterized by simplicity of construction and design. Thus, as distinguished from prior systems in which carriers are suspended from an overhead track and driven by a conventional drive chain, the present system employs a track system on which is supported an endless series of wheeled carriers for the loads to be transported, the carriers being propelled by means of a towing cable arranged above the track and supported solely or at least to a major extent by the carriers and hence by the track itself. A novel form of towing cable drive is utilized, such being also supported from the track which accordingly provides the main support for the carriers traveling thereon, for the towing cable and for the cable driving mechanism.

The invention also contemplates simple and effective means by which the traveling carriers are enabled automatically to pick up appropriately positioned loads at the loading station, and by which the loaded carriers as they move past the selected unloading station or stations may deposit their loads on suitable load receiving means, such as the lowering means usually associated with each unloading station.

In systems to which the present invention has especial application, the loads are elevated at the distributing or loading station to the level at which the carriers as they are propelled along the track may pick them up and carry them on to the selected unloading stations to cause the carriers to there deposit the loads and to lower them to the working levels thereof.

The present invention contemplates improved means of simplified construction and operation by which the operator at the loading station may select a particular receiving station to which a load or a plurality of loads is to be conveyed and there deposited and by which the carriers themselves, following the appropriate setting of the station selecting means, control the elevation of the loads at the loading station to the level at which they may be picked up by the carriers, and also the subsequent deposition and lowering thereof upon the carriers arriving at the selected receiving stations.

The invention further proposes safety features providing that only an empty carrier is effective to actuate the elevating means at the loading station to its "up" position and by which a carrier, even though empty, may travel past the loading station without actuating the elevating means to its "up" position in the event that no loads are available for loading or because the feed of the loads to the elevator has become disrupted.

Similarly, provision is also made for a loaded carrier passing the selected unloading station for recirculation about the track in the event that such station is not properly conditioned to receive the load destined for it, as where a previously deposited load has failed to clear the unloading elevator or unloading chute associated therewith.

A further feature of the present invention resides in an improved mode of delivering the loads to the elevator at the loading station and provides not only for predetermined feed movement of the loads to the elevator, but also that such movement can occur only when the elevator is in proper position to receive a load, with the feed means being actuated by an already available source of power.

Other objects will be in part obvious and in part hereinafter pointed out in connection with the following analysis of this invention wherein is illustrated an embodiment of the invention in detail.

In the drawings—

Fig. 1 is a side elevation of a suggested installation of a conveyer system in accordance with the present invention;

Fig. 2 is a plan view of the system illustrated in Fig. 1;

Figs. 2A and 2B are details of the vertical turn or corner guiding means for the carrier towing cable;

Fig. 3 is a plan view of the drive mechanism for the towing cable;

Fig. 4 is a side elevation of the cable drive illustrated in Fig. 3;

Figs. 5, 6 and 7 are detail views illustrating features of the cable driving mechanism;

Figs. 8, 9 and 10 are side, plan and elevational views, respectively, of a carrier in accordance with the present invention, these views further illustrating the towing post connection between the driving cable and the carriers, and the carrier-mounted tabs which are set by setting mechanism under control of the operator at the loading station.

Fig. 11 is an enlarged detail view illustrating the relation of a tab to a carrier following setting of the tab;

Fig. 12 is a partial perspective view of the construction of the carrier track;

Fig. 13 is a side elevation illustrating the loading station elevator, the tab-setting mechanism associated therewith, and the elevator hoisting mechanism;

Fig. 14 is an end elevation of the parts illustrated in Fig. 13;

Fig. 15 is a plan view of the loading station elevator and associated tab-setting mechanism;

Figs. 16 and 16a are detail views of the tab-setting or dialing mechanism;

Figs. 17 and 18 illustrate, respectively, the manner in which a carrier may pick off a load from the loading station elevator and the manner in which a carrier may deposit a load on an unloading station elevator;

Fig. 19 is a side elevation of the work-box feeding incline for the loading station elevator and associated mechanism;

Fig. 20 is a plan view of the mechanism illustrated in Fig. 19;

Fig. 21 is a perspective view of the leverage system for actuating the valve which controls supply of pressure fluid to the loading station hoist;

Fig. 22 is a detail view of the valve as aforesaid;

Fig. 23 is a perspective view of the leverage system for actuating the valve which controls supply of pressure fluid to an unloading station hoist;

Fig. 24 is a perspective view of an unloading station mechanism for operation by a particular tab combination, and of the leverage system employed therewith in the control of an unloading station hoist valve;

Fig. 25 is a side elevation of the load discharge chute associated with an unloading station elevator and related mechanism;

Fig. 26 is a plan view of the mechanism illustrated in Fig. 24.

Referring to the drawings in detail and more particularly to Figs. 1 and 2, such being illustrative of an installation of a conveyer system in accordance with the present invention in a two-floor industrial plant, there is indicated at A a loading station located, for example, at a focal distributing point on the first floor X for work in various stages of completion which is to be conveyed to and deposited at selected work stations located mainly in other parts of the plant, as on the second floor level Y. It will be understood that the two-floor plant arrangement and the suggested location of stations is illustrative only, as all operations may be performed on one floor or they may be performed on any number of floors in excess of the two floors shown, depending upon the particular requirements or the particular industrial plant in which the system is installed.

In the particular installation under description, it will be assumed that there are sixteen stations to which work from the loading staion A is to be distributed (stations B, F, G, O, P and Q being indicaed), the number of unloading stations being so given because the carriers of the system to be described are each provided with two sets of four station selecting tabs which permit of sixteen different combinations, and hence the actuation of sixteen different unloading station mechanisms. The number of loading and unloading stations will depend of course upon the requirements of a particular installation, and the illustrated arrangement of a single loading station and sixteen unloading stations is suggested for purposes of illustration and description only.

As distinguished from prior overhead conveying systems in which carriers are suspended from an overhead track by trolleys driven by a conventional drive chain, the present invention employs an overhead track of endless construction as at 10 (Figs. 1 and 2), the track being positioned at an appropriate level above the floor from which it is supported and generally adjacent the ceiling of the particular floor. The track as illustrated has a rising incline portion 11, the inclination of which is somewhat under thirty degrees to the horizontal and the length of the inclined stretch of track being such as to extend to an appropriate level above the second floor.

Upon reaching this level, the track at a desired point may make a 180° turn or loop and thereafter extends straightway in the illustrated embodiment for a substantial distance which may be several hundred or several thousand feet.

At its other end the track is shown to make a reverse 180° turn or loop and may thereafter slope downwardly as at 12 to return to its first floor level as indicated. Preferably the track structure is supported at suitable intervals along its length by risers or standards from the floor over which it extends although suitable ceiling brackets may be utilized when and if necessary to assist in supporting the track.

The construction of the track and the rails thereof is better illustrated in Fig. 12 wherein is shown a straightway stretch or section having an outer track generally indicated at 20 and an inner track generally indicated at 21. The outer track is comprised by an outer C-shaped rail 22 and an inner C-shaped rail 23, the rails being shown as integral but where formed separately, they are also generally C-shaped in section, being secured together in back-to-back relation. Each of the rails 22, 23 has a wheel retaining vertical flange 24, 25, respectively, the bottom flanges 26, 27 extending horizontally and being devoid of any vertical flange such as the flange 24. The inner track 21 may be comprised by a rail of L-shaped section so arranged that one flange extends horizontally. The outer and inner tracks are rigidly secured together along straightway stretches as by transverse beams 28, the looped ends of the track being shown as supported by outer and inner corner plates 29a, 29b, of which the inner plate 29b is utilized in place of the inner track 21 at the loop ends of the track structure.

The track as above described is adapted to provide a support for a plurality of three-wheeled carriers to be more specifically described in connection with Figs. 8, 9 and 10, of which front and rear wheels arranged on the relatively outer side of the carrier run in the inner and outer rails 22, 23 of the outer track, a third wheel arranged on the inner side of the carrier and intermediate the outer wheels running on the inner track 21, except at the loop ends where the inner wheel runs on the inner corner plates 29b.

The contemplated track arrangement is such that the carriers are maintained substantially horizontal throughout not only the straightway stretches including the rises and dips at the loading and unloading stations, respectively, as will be described, but also in negotiating track inclines and slopes such as the rising incline stretch 11 and the lowering slope stretch 12 previously referred to. Thus, with the carrier rear wheel running in the outer rail 22 and the carrier front wheel running in the inner rail 23 of the outer track, the inner rail of a level stretch going into a rise is continued beyond the outer rail a distance which is equal to the distance between the front and rear carrier wheels, following which the rails extend along the incline in relatively spaced and parallel relation as indicated by the designations 22 and 23 applied to the rising track section 11 of Fig. 1. As the carrier inner wheel is intermediate the outer front and rear wheels, the inner track 21 in going into a rise is continued to a point intermediate the points where the outer rails begin their rises and from thence extends along the incline and intermediate the outer rails. When viewed in side elevation as in Fig. 1, this relation appears from the track designation 21 in the rising section 11.

In going from a level stretch into a slope the opposite arrangement obtains; that is, the inner rail 23 in which the carrier front wheel runs is relatively above the outer rail, with the inner track being disposed intermediate the inner and outer rails of the outer track, as will be apparent from the slope section 12 in Fig. 1.

By the aforesaid arrangement the three carrier wheels and hence the carrier in negotiating an incline are maintained horizontal and are similarly maintained horizontal in negotiating a track slope, so that the carrier loads are at all times properly maintained in the carriers, not only as the carriers travel over the straightway track section but also when the carriers change elevation as in going from one floor or track level to another.

The carriers are propelled along the track 10 by a towing cable 30 disposed above the carriers and along the longitudinal center line of the track, the cable being of endless construction and engaging at its loop ends with idler guide sheaves 31, 32 supported by posts 33 from track corner plate 29a. The cable is of flexible construction so that it can make horizontal turns of relatively small radius and can also make vertical turns as required to follow the inclines and slopes of the carrier track. Preferably, track-supported brackets carrying upper and under corner rolls as may be necessary are provided at 34, thus to ease the cable over or under such turns and to properly guide it with reference to the track portions of varying elevation.

By reference to Figs. 2A and 2B, illustrating a suggested arrangement of vertical corner brackets in relatively large scale, a bracket post having a vertical leg 34a, a transverse arm 34b, and a depending vertical leg 34c is shown to be supported from the track or from a transverse beam extending thereacross. Secured to the depending leg 34c are spaced bars 34d, 34e, both of which extend along an arc determined by the radius of the turn. Between the bars extends a plurality of axles 34f on which flanged corner rolls 34g are journaled. With the cable following the inclination of the track, and with the track going into a rise, the relatively lower bracket is arranged so that the cable 30 runs under rolls 34g, whereas with the cable going from an incline to a horizontal stretch, as on the second floor level, the cable runs over the rolls 34g. The transverse arm 34b of the bracket post is elevated with reference to the rolls 34g to provide carrier clearance as the carrier changes elevation.

By reference to Figs. 3-7 inclusive, the cable 30 is constituted by a plurality of interconnected sections which are preferably joined by splices and drive shackles alternately arranged. Thus of five adjacent sections identified by characters 30a, 30b, 30c, 30d and 30e, cable section 30a is connected to cable section 30b by a splice 35; cable section 30b is connected to cable section 30c by a shackle 36; cable section 30c is connected to cable section 30d by a second splice 35, and cable section 30d is connected to cable section 30e by a second shackle 36. The alternately arranged splices 35 provide convenient means of connecting the carriers to the cable 30 by towing posts to be described, the alternately arranged shackles 36 providing a driving connection between the cable and a caterpillar drive mechanism to be described whereby the cable is continuously actuated in an endless path.

The caterpillar drive mechanism for the cable is supported by framework generally indicated at 40 (Fig. 3) which is in turn supported at both of its ends from the track structure by posts or standards 41. The framework may be comprised by longitudinal angle members 42, 43 secured in spaced parallel relation by transverse beams 44, 45. To one end of the framework is secured a supporting plate 46 for a geared head motor 47 adapted through suitable reduction gearing generally designated 48 to actuate a drive sprocket 50 turning on a vertical axis. At the other end of the supporting framework is mounted an idler sprocket 51, the sprockets 50, 51 being arranged in alignment and suitably supported from framework 40.

Also supported in alignment in the framework are the idler sprockets 52, 53 turning on vertical axes in a plane spaced from the axes of the sprockets 50, 51. The distance between sprockets 52, 53, while greater than the length of two cable sections, is substantially less than the distance between sprockets 50, 51, so that with the sprockets turning in clockwise direction (Fig. 3), an endless caterpillar drive chain 55 driven by sprocket 50 and supported by the idler sprockets 51, 52, and 53 has an inclined stretch 55a which approaches cable 30, a straightway stretch 55b between sprockets 52, 53 which runs parallel to and closely adjacent a substantial stretch of the cable 30, a stretch 55c which inclines away from the cable 30, and a return stretch 55d extending between sprockets 50, 51.

The drive chain 55 carries a plurality of cable driving shoes generally indicated at 60 (Fig. 6), each having a horn portion 61 provided with a chain receiving gap 62 (Fig. 5) and an inclined leg portion 63. The shoes are each secured to the chain by a cross pintle or axle 64 on the axis of which the shoe may turn relatively of the drive chain, a pair of spaced supporting rollers 65a, 65b being carried at the ends of the pintle 64. In the free end of the leg 63 is arranged a cross axle 66 for a second pair of supporting rollers 67a, 67b.

As the chain 55 travels along the straightway portion 55b adjacent the towing cable 30, the horn portions 61 of the driving shoes are adapted to engage with the cable shackles 36, thus to drive the cable. Accordingly the shackles 36 which are spaced from each other the distance between driving shoes 60 are each provided with an elongated horn receiving opening 36a into which the horn portion of a drive shoe is adapted to be projected. Preferably, the relatively forward and rearward edges of opening 36a are rounded as indicated in Figs. 6 and 7, the horn being provided with rounded front and rear seats for engagement with either the front or rear edges of a shackle opening. With no tendency of cable 30 to overrun, a driving horn engages the front edge of a shackle opening, thus to actuate the towing cable to the right (Fig. 3). However, any tendency of the cable to overrun is checked when the rear edge of the shackle opening engages against the rear seat of the horn then in engagement with said shackle. Inasmuch as the length of the drive chain stretch 55b is greater than the length of two cable sections and hence of the distance between the shackles, at least one drive shoe is always in engagement with a cable shackle, thus insuring continuous cable drive and cable retarding effect when the latter is necessary.

In order that the horns 61 of the drive shoes maintain a fixed right-angular relationship with reference to the driving cable 30, the shoes are guided by a suitably arranged track system supported from framework 40 as they move throughout the stretches 55a, 55b and 55d of the driving chain. Thus, as indicated in Fig. 5, rollers 65a, 65b travel in spaced, oppositely disposed C-tracks 68, 69, and rollers 67a, 67b travel in a single C-track 70. The tracks 68, 69 are preferably secured to each other along cable stretch 55b, the length and inclination of the shoe legs 63 being such that with this track relation the horn portion of the driving shoes extend at right angles to the cable. Due to the relative inclination of chain stretches 55a, 55c, track 70 must be spaced from tracks 68, 69 so that the driving shoes are turned on the axes of their pintles 64 an angular amount which corresponds to the angle of inclination of said inclined cable stretches. Thus, for drive chain stretch 55a, track 70 is spaced from tracks 68, 69 by a spacer 71 an amount such that the slope of the shoe legs 63 of the shoes negotiating the spaced track portions is the same as the slope of the shoe legs negotiating the track section adjacent the straightway stretch 55b, whereby the driving horns move at right angles to the cable during their entry into the shackle openings. At the right end of the track section and along the receding drive chain stretch 55c, the track section 70 is continued beyond the end of tracks 68, 69, which terminate on the center line of sprocket 53, the section 70 then terminating in an inclined portion of relatively short length which extends substantially parallel to the drive chain stretch 53. In this manner the horns are withdrawn from the cable shackles 53 while maintained at right angles thereto.

Referring now to Figs. 8, 9 and 10 illustrating the carrier and related mechanism, one of the plurality of carriers is generally designated 80, being constituted as by an inverted U-shaped framework having an upper transverse member 81 connecting vertically arranged and spaced side pieces 82, 83, each having a forward lower extension 84. The relatively lower edges of the side pieces are turned inwardly to provide facing flanges 85, 86 which extend horizontally and in spaced relation. The spacing between flanges is such that the elevators at the loading and unloading stations may move into the position indicated in dotted lines (Fig. 10). The spacing between the vertical side pieces of the carrier is such as to accommodate a load to be transported, such as a work box 87 positioned in the carrier and supported therein on the flanges 85, 86. It will be here noted that the carriers are each open at their bottom and front and rear ends so that a carrier may move over a load positioned to be picked up and so that the carrier may move away from a load which it has deposited on suitable load receiving means.

The relatively outer side piece 82 of each carrier has a lateral extension 88a from which depends a mounting plate 90a spaced from the side piece 82. A mounting plate 90b carried by the inner side piece 83 through extension 88b thereof is also provided. Mounted on the inner face of the plate 90a is a caster support 91 for a rear supporting wheel 92. The forwardly extending portion 84 of the carrier is also provided with a caster support 94 for a front supporting wheel 95. As indicated in Figs. 8 and 10, the rear carrier wheel 92 runs in the outer rail 22 of the outer track 20, and the front carrier wheel 95 runs in the inner rail of the outer track, the wheels being held to the outer and inner rails by the overhanging flanges 24, 25 thereof.

On its relatively inner side the carrier is supported by a third wheel 97 mounted on the carrier by a caster support 98, the wheel 97 being arranged midway between wheels 92, 95 and running on the inner track 21. This arrangement of three supporting wheels, with the third wheel being arranged on the relatively inner side of the carrier and midway between the front and rear wheels thereof permits the carrier to turn on relatively short radii, while at the same time providing the necessary support and stability.

The connection between the towing cable 30 and the carriers is also illustrated in the figures under consideration. Preferably this connection takes the form of a C-shaped tow post 100, of which the upper horizontal leg 101 is pivotally related at one end to the vertical cross part of the post, the other end carrying a vertical pivot 102 carried by the cable splice generally indicated at 35. The lower leg 103 of the tow post is pivoted to turn on a vertical pivot 104 extending through the top connecting piece 81 of the carrier. The arrangement is such that each of the tow posts, while connecting the cable 30 and a carrier, may pivot on the axis of the vertical pivots 102, 104 to position permitting the carrier to make both right and lefthand horizontal turns. Following setting in one position, the tow post is held in that position by an over-center spring 105 until the post is engaged by a fixed cam or arm mounted just before each horizontal corner sheave where reversal is necessary. The C-shape of the tow posts is provided to permit rollers of vertical corner brackets 34 (Figs. 2A and 2B) to pass relatively through the post.

The splice 35 as illustrated in Figs. 8 and 9 is preferably constituted by cable end-blocks 35a, 35b, into each of which is secured the end of a cable section, the end blocks being flexibly connected as by coupling links 35c, 35d, 35e, which permit the splice to flex vertically and horizontally. Vertical pivot pin 102 preferably extends through the elongated through-opening of the intermediate link 35d.

The carriers are each provided with outer and inner sets of tabs which are normally maintained in retracted position, but which may be actuated in varying combinations to operative position by setting mechanism under the control of the loading station operator. The set of outer tabs is mounted on the outer plate 90a, the set of inner tabs being mounted on the inner plate 90b. As the outer and inner sets of tabs are of identical construction, differing only in that one is of righthand and the other of lefthand construction, only one set of tabs of a carrier will be described.

Extending from the outer plate 90a is an upper block 110 in which is journaled the upper end of a spindle 111, the spindle extending through a bracket 112 secured to the plate and having its lower end journaled in the lower flange of said bracket. Mounted on said spindle between the bracket arms for movement independently of each other are a plurality of tabs which in the construction illustrated are four in number, being designated 114a, 115a, 116a, and 117a. It will be here noted that the tabs of the inner set are designated 114b, 115b, 116b and 117b. The tabs are each normally maintained in inoperative position (Fig. 9) by a torsion spring 118, one end of which is hooked over a tab part, the other end bearing against the relatively outer face of the frame plate 90a. The tabs are each generally L-shaped in contour, having an elongated arm 120, an intermediate shoulder 121, and a notched end 122. Upon the shoulder 121 of a retracted tab being engaged by an element of the tab setting mechanism to be described, the tab is swung about axis of spindle 111 to its open or operative position as indicated in Fig. 11, in which it is held as by a triangular latch bar 124 fixed to and mounted for turning movement with a pin 125 journaled in block 110 and bracket 112.

Latch bar 124 is maintained in tab latching position by a torsion spring 126 secured at one end to the bar as by screw 127, its other end bearing against the relatively outer face of the frame plate 90a. When so latched in open or operative position, a tab maintains such position until latch bar 124 is turned clockwise (Fig. 11) upon trip pin 128 (Fig. 10) which is carried on a downward extension of latch spindle 125, being engaged by a tab release pin carried by the unloading station elevator, as will be described.

Each of the carriers is also provided with a load bar 130 pivoted to the box supporting flange 85 as at 131 and being normally biased by spring 132 to the inclined or sloped position indicated in Fig. 8. Upon a load being picked up by the carrier, however, the relatively rear end of the load bar 130 is depressed and its forward or front end is accordingly raised out of the path of a trip lever for actuating the valve controlling the elevator hoist at the loading station as will be described.

The means for setting the tabs may take various forms, the illustrated setting means being carried by the loading station elevator so that as the elevator moves to its "up" position the tab setting means carried thereby also moves to a position, depending on its setting, as to engage one tab on each side of a carrier negotiating the track above the station.

As the tab setting means is carried by and movable with the loading station elevator the latter and its actuating means will be first described.

Referring to Figs. 13, 14 and 15, reference character 140 designates a forked or U-shaped elevator platform having an under frame 141 including a transverse member the ends of which are provided with holes through which pass guide rods 142, 143 extending between the floor and the overhead track structure. The guide rods serve to guide the elevator platform in its vertical movement.

Frame 141 has secured to its under portion anchor rods 146, 147, which extend downwardly, the lower ends of which carry rearwardly extending anchor arms 148, 149. Secured to each of the anchor arms is a hoisting cable, the relatively outer cable 152 being illustrated in Fig. 13, the transversely spaced inner cable 153 being indicated in Fig. 14. Each cable runs over upper sheaves 155, 156 and under an intermediate lower sheave 157, the fixed ends of the cables being secured as by clevis elements 158 and 159 to the ends of an equalizing bar 160, which latter is pivotally carried intermediate its ends by a post 161 extending from the lower end of a fixed hoist cylinder 162.

The lower intermediate sheaves 157 rotate on a fixed axis, being carried as by a bracket 165 secured to the hoist cylinder. The upper pairs of sheaves 155, 156 are carried by a bracket support 166 secured to the piston cross head 167 and accordingly move with the cylinder piston (not shown).

The hoist cylinder is rigidly suspended from the track structure by carrying rods 168, 169 secured at their upper ends by bolts to a transversely extending track bracket 170. Each of the hoisting cables 152, 153 is preferably provided with a turnbuckle 172 whereby the effective length of the cables may be adjusted evenly. Suitable sheave guards 174, 175 may be provided to maintain the cables seated in the grooves of the sets of movable sheaves 155, 156. Similarly, sheave guards 176 maintain proper engagement of the cable in the lower fixed sheave 157.

Upon pressure fluid being supplied to the lower end of the cylinder 162 to actuate the piston therein on its "up" stroke, piston cross head 167 and hence sheaves 155, 156 are raised, thus effectively to shorten the length of the cable stretch between elevator anchor arms 148, 149 and sheaves 155, thereby to actuate the elevator platform to its "up" position.

Considering now the tab-setting mechanism, reference character 180 indicates an elongated U-shaped bracket secured to the elevator underframe 141 below its effective platform surface. The end flanges 181, 182 of the bracket extend laterally of the platform 140 for a substantial distance and are vertically arranged as indicated in Fig. 13. Secured to bracket flange 181 is a guide tube 184 and secured to the bracket flange 182 is a guide tube 185, the tubes providing a guide mounting at each side of the elevator platform for tab rods 186, 187. At their upper ends the rods carry tab-setting arms 188, 189 which are secured to the rods as by coil springs 190, 191, each having one end secured to a rod and its other end held by one of the collars 192, 193 fixed on the respective rods. Springs 190, 191 bias the arms 188, 189 so that in tab-setting position they extend inwardly and into the path of shoulders 121 of the carrier tabs.

The lower ends of the tab rods 186, 187 are each provided with a rack surface indicated at 195 (Fig. 16). Extending between the bracket flanges 181, 182 and journaled for rotation therein is a shaft 196 carrying at its relatively outer end a pinion 197 meshing with the rack surface of tab rod 186. Also extending between the bracket flanges is a second rotary shaft 198 carrying at its relatively inner end a pinion 199 meshing with the lower rack end of tab rod 187.

The relatively outer ends of both shafts 196, 198 project beyond the bracket flange 181 and are adapted to be rotated by cranks 200, 201 carrying handles 202, 203, respectively. Extending from the inner end of each of the handles is a stem adapted to engage one of a series of five holes in the bracket flange 181 associated with each handle. The five holes of each series are spaced along the circumference of a circle described by a handle as it is rotated throughout its arc of movement. One hole a of each series designates a neutral point at which, even though the tab setting mechanism is in raised position, tab setting arms 188, 189 are disposed below the lowermost tab 114a, 114b of the tab sets mounted on a carrier. Upon handles being turned clockwise so that the handle stems engage in holes b, the tab rods 186, 187 are raised a predetermined amount such that when the elevator and tab setting mechanism carried thereby is in its "up" position, tab setting arms 188, 189 line up with tabs 114a, 114b, as indicated by the dotted line showing (Fig. 13). When so lined up, the arms 188, 189 are adapted to engage the shoulders 121 of the designated tabs (see dotted line showing Fig. 15) as the carrier moves past the raised setting arms, thus to set or arcuate the tabs to their open or operative position indicated in Fig. 11.

Similarly, actuation of handles 202, 203 to a position in which handle stems engage in holes c of the series causes further upward movement of tab rods 186, 187 to a position in which tab arms 188, 189 line up with tabs 115a, 115b. In like manner, further movement of handles 202, 203 to positions in which the handle stems engage in holes d of the series actuates the tab rods 186, 187 upwardly an amount such that tab arms 188, 189 line up with tabs 116a, 116b. Finally, when handles 202, 203 are turned so that their stems engage in holes e of the series, tab arms 188, 189 are raised to a position that they line up with tabs 117a, 117b.

The described arrangement of tab setting or dialing means in conjunction with the independent mounting of each of the tabs of the sets thereof permits of sixteen different combinations of tab settings. Thus handle 202 may be turned so that its pin engages hole b of the series of holes associated therewith, with handle 203 being turned to selectively engage in either hole b, c, d or e of its series, thus providing four combinations of settings. A second setting of handle 207 in hole c of its series provides an additional four combinations. Again, setting of handle 202 in hole d of its series provides a third series of four different combinations; and, finally, setting of handle 202 in its hole e permits of four different combinations. Accordingly it will be seen that the dialing mechanism as described permits setting of the tabs mounted on a carrier in sixteen different combinations, with each combination being related to a particular receiving or unloading station as will appear in the following description.

As indicated in the foregoing, the present invention proposes that the carrier as it moves past the loading station automatically pick off a work box constituting the load from the raised loading station elevator. So that this action may be accomplished both automatically and by simple means, the track at the unloading station is so constructed and arranged that it causes a carrier negotiating this portion of the track to move upwardly of the elevator, while at the same time maintaining the carrier horizontal. To this end, reference being made to Fig. 12, the inner rail 23 and the outer rail 22 of the outer track 20 are provided with inclined rises or humps 23a and 22a, respectively, the inner rail 21 being also provided with a rise 21a. The said track rises having a uniform slope or angle of inclination. The distance between rises 22a, 23a of the rails of the outer track is equal to the distance between the outer wheels 92, 95 of a carrier, the distance between rises 23a and 21a and between 21a and 22a being the distance between wheels 95, 97 and between wheels 97, 92. By reference to Fig. 17, it will be seen that as the carrier moves up the track rises, it gains elevation while maintaining its normal horizontal position, and upon negotiating the rise travels along the track at the relatively raised elevation.

The relation of the loading station elevator in its "up" position to the track rise is illustrated in Fig. 17 wherein it will be understood that the elevator is stationary, having been actuated to its uppermost position between the outer and inner tracks of the track structure. In this "up" position, the top surface of the elevator platform extends approximately flush with the level or plane assumed by the carrier flanges 85, 86 upon the carrier negotiating about half of the rise. Considered lengthwise of the track the elevator is positioned so that its front and rear edges are located approximately in alignment with the front and rear edges of the side pieces 82, 83 of a carrier when the latter has traveled half-way up the rise.

Assuming an empty carrier is moving to the left to approach the raised elevator having thereon a load such as the work box 87, it will be understood from the prior description, particularly in connection with Fig. 10, that the work box has a substantially greater width than the elevator. As the carrier negotiates the low level portion of the track immediately to the right of the rise, and also the lower half of the rise, carrier flanges 85, 86 move into position below the box and extend along the sides thereof. However, as the carrier completes the last half of the rise, carrier flanges 85, 86 engage the bottom of the box along its side corners and the further change in carrier elevation is utilized in lifting or picking off the box from the elevator. With the box positioned in the carrier and supported on the carrier flanges 85, 86, the carrier is propelled forwardly and conveys the box along the path of movement as defined by the track structure.

The present invention further provides mechanism responding to the approach of an empty carrier to the loading station for controlling actuation of the elevator to its "up" position prior to the arrival of the carrier at the station. The mechanism by which this elevator control is effected is schematically illustrated in Fig. 21, in which reference character 210 indicates a trip lever mounted on a rock shaft 211 which extends below the track and transversely thereof. As indicated in Fig. 9, trip lever 210 is positioned normally to extend into the path of load bar 130 when the latter is biased to its sloped position indicated in Fig. 8. Rock shaft 211 at its relatively inner end carries a forked arm 212, the fork of which straddles a rod 213 adjacent fixed collar 215, one end of the rod being connected to a valve operating arm 214. The valve 219 operated by arm 214 is indicated in Fig. 22 and comprises a three-way valve which controls communication between pressure fluid supply line 216 and line 217 extending to the lower end of the hoist cylinder 162, and also between line 217 and cylinder exhaust line 218. When handle 214 is actuated to the right (Fig. 22), the valve establishes communication between supply line 216 and line 217, and hence admits pressure fluid to the hoist cylinder. When handle 214 is in its left position, the valve provides communication between lines 217 and 218 whereby the hoist cylinder may exhaust. Handle 214 is held in the position to which it has been actuated by overcenter spring 220.

Normally, valve handle 214 is maintained in its leftwise position due to action of spring 220, whereby the hoist cylinder is connected to exhaust, with the weight of the piston, elevator and related mechanism thereby causing the elevator to assume its low position. Upon an empty carrier approaching the loading station, however, load bar 130 engages trip lever 210 and turns it in counter-clockwise direction, thus to rock shaft 211. Accordingly forked arm 212 is actuated in like direction, and its lower forked end engages collar 215, thus to actuate rod 213 and valve handle relatively to the right and thereby establish communication between lines 216 and 217. Accordingly fluid pressure is supplied to the lower end of the cylinder and beneath the piston therein, the piston is actuated on its up stroke, and the elevator with a load thereon is actuated to its up position. It will be understood that trip lever 210 is positioned in advance of the loading station sufficiently so that by the time the empty carrier reaches the station the elevator is in fully raised position.

The present invention further contemplates means controlled by the carrier for effecting lowering movement of the elevator at the loading station following picking up of a work box from the raised elevator. To this end, inner and outer fixed release bars 231, 232 (see Fig. 9) are securely mounted on the carrier mounting plates 90a, 90b, respectively, the nose portions of the release bars extending well in advance of the tabs mounted on the carriers and the bars being spaced laterally of the carrier proper. Release bars 231, 232 are adapted to engage release levers 234, 235 (Fig. 21) fixed on a rock shaft 236 extending below the track and transversely thereof, the positioning of shaft 236 being somewhat beyond or past the loading station. Secured to rock shaft 236 is an arm 237 to which the other end of rod 213 is secured. Turning movement of release levers 234, 235 in counterclockwise direction causes rocking movement of shaft 236 and counterclockwise movement of arm 237, the latter movement actuating rod 213 axially to the left (Fig. 21).

Release levers 234, 235 are so positioned that their upper ends are engaged by release bars 231, 232 of a carrier as the carrier, following picking up of a load, moves away from the loading station. Thus, following actuation of valve handle 214 to the right upon load bar 130 engaging trip lever 210, the release bars engage levers 234, 235 to return valve handle 214 to its leftwise position, thus permitting the cylinder to exhaust and the elevator to lower to its initial position. Thereupon, valve handle 214 is held in its leftwise position by spring 220 until the next empty carrier engages trip lever 210 thus to actuate the valve handle 214 to the right and to call up the loading station elevator.

It will be noted that rock shaft 211, in addition to rocking movement as aforesaid, is also permitted tilting movement in a vertical plane by its mounting in a universal bearing element 238. This tilting is effected as by pulling down the outer end of the shaft 211 to its dotted line position indicated in Fig. 21. In this dotted line position trip lever 210 is depressed out of the path of load bar 130 of any approaching empty carrier. As will be hereinafter described, rock shaft 211 takes up its dotted line position when there is no load available to the elevator, it being obvious that under this condition actuation of the elevator to its up position serves no useful purpose.

Referring to Figs. 19 and 20, the present invention further provides mechanism operating to supply loads to the loading station elevator under the control of the elevator. Accordingly there is arranged adjacent the elevator a downwardly inclined feed chute constituted in part as by side frame angles 250, 251 supported in inclined position above the floor level by sets of uprights 252, 253. Angles 250, 251 are arranged in facing relation, the vertical flanges thereof being spaced an amount slightly in excess of the width of the work boxes adapted to be supported thereon by the horizontal flanges. Rollers sections 255, 256 supported by sets of uprights 253, 254 provide a continuation of the side frame angles and carry a plurality of rollers 257 which permit the work boxes to roll into place on the elevator platform. By reference to Fig. 20 it will be seen that the roller sections are spaced to accommodate the elevator platform 140.

Arranged intermediate the side frame angles and roller sections is an intermediate roller section 260 which may be secured to the chute framework as by a parallel linkage mechanism not shown. The intermediate roller section 260 is normally higher than the side roller sections but is depressed as a loaded work box rolls over it. Carried by the intermediate roller section is a downwardly extending push rod 262, the lower end of which is pivotally connected to one arm of a bell crank 263 arranged to turn about pivot 264 of a bracket arm 265 extending downwardly from the chute side frames. A spring 266 secures the other arm of the bell crank to a fixed part such as a cross beam extending between the sets of uprights 253. Spring 266 normally urges the bell crank 263 in clockwise direction, thus to maintain the intermediate roller section 260 in its relatively elevated relation, unless a weight of a loaded work box thereon causes said section to be depressed.

By further reference to Fig. 20 it will be seen that the relatively lower end of the intermediate section 260 extends into the space 140a between the forks or legs of the elevator platform. When the platform is in its low position it engages lugs 270, 271 secured on stop rods 272, the stop rods being each normally urged to "up" position by means of springs 273. In such "up" position the upper ends of the stop rods which extend through a frame cross piece 274 project into the normal path of a work box moving down the chute to the elevator, thus to prevent movement of the work boxes on to the elevator except when the elevator is in its low position.

As the intermediate roller section 260 is depressed by the weight of the work box rolling thereover, push rod 262 is similarly actuated downwardly to turn bell crank 263. The other arm of the bell crank is connected to one end of a push rod 275, the other end of which is connected to one arm of a bell crank 276 pivoted for turning movement in a bracket support 277, the other arm of the bell crank being connected to a rod 278. This rod 278 is substantially vertically disposed and has its upper end secured to an arm 280 of a collar fixedly secured to the other end of the rock shaft 211. Thus, with no work box on the roller sections of the chute as would depress the intermediate section, leverage system 262, 263, 275, 276, 278 results in rock shaft 211 being tilted to its dotted line position (Fig. 21) whereby to move trip lever 210 out of the path of the carrier load bar 130 as previously referred to. With a load on the roller sections of the incline causing depression of the intermediate rollers 260, however, push rod 278 is actuated upwardly to return rock shaft 211 to its full-line position, with the result that trip lever 210 is in position to be engaged by the load bar 130 of an empty carrier.

In order that the work boxes may be fed one at a time to the elevator box, pusher means deriving its power from the elevator hoist is employed. Such pusher means may include a plurality of U-shaped pusher arms 285 spaced from each other substantially the length of a work box, the pusher arm units being each pivoted to the legs of a U-shaped bracket 286 which are secured to parallel, axially movable pusher rods 287, 288. The weight of the cross pieces of the U-shaped pusher arm units 285 is sufficient to maintain them in their inclined position as indicated in Fig. 19. However, the free end of said arms may be depressed readily to ride under work boxes carried by the side frame angles during movement of rods 287, 288 and pusher arms to the left. Said rods are maintained in their relatively leftwise position by a tension spring 290 secured to a cross angle 291 extending between the side frame angles and through a flange of which the ends of the rods 287, 288 extend. The other end of the spring 290 is fixed in arm 292 secured to one of the push rods 288.

Also secured to arm 292 is one end of a cable 293 running over idler sheaves 294, 295, 296. The other end of the cable is secured to the piston cross head 167 (Fig. 14). Thus, as pressure fluid is supplied to the lower end of the cylinder and the cross head is raised, cable 293 actuates push rods 287, 288 relatively to the right (Figs. 19 and 20), thus to actuate the pusher arms 285 also to the right. During this movement, the upper or free ends of the arms of the pusher units engage the rear sides of work boxes positioned on the chute to move them forward the distance of one box, the stroke of the push rods 287, 288 being predetermined in relation to the stroke of the piston cross head to effect this limited movement.

By the above described arrangement it will be seen that despite the positioning of a plurality of work boxes on the inclined chute, nevertheless a box cannot be fed on to the elevator platform unless the platform is in its low position. It will also be appreciated that at least one work box must be positioned on the low end of the chute and so available for feed to the elevator before any empty carrier negotiating the track in advance of the loading station can effect actuation of the elevator to its up position, and, finally, that each upward actuation of the elevator causes a step by step feeding movement of the work boxes into a position that when the elevator returns to its low position the lowermost box will roll on to the same.

Assuming that a particular carrier has picked up its load from the loading station elevator and that the tab setting mechanism has set into operative position a tab on each side of the carrier, in accordance with the operator's dialing and selection, the carrier in its further travel on the track structure eventually arrives at the selected receiving or unloading station having mechanism which corresponds to the particular tab setting of the carrier. The arrangement is such that this latter mechanism when actuated functions to call up an elevator located at the selected station, whereupon the carrier deposits its load thereon. In moving past the unloading station, the empty carrier actuates mechanism operative to effect lowering of the elevator so that the load is lowered to the working level of the station, this latter carrier movement also effecting unlatching of the carrier tabs whereby they are returned to their normal inoperative position.

Considering first the aforesaid mechanism at the selected unloading station which effects actuation of the elevator at that station to its up position, reference is had to Figs. 24, 25 and 26. In advance of each unloading station is a pair of U-shaped bell crank levers, of which one lever generally designated 300 is disposed at the relatively outer side of the track, the second bell crank lever 301 being disposed at the inner side. The outer bellcrank 300 includes a rock shaft 302a, an inwardly directed station tab arm 303a, and a lower arm 304a. The tab arm 303a is arranged at the level of one of the tabs 114a, 115a, 116a, 117a. The inner bellcrank 301 similarly includes a rock shaft 302b, an outwardly directed station tab 303b, and a lower arm 304b, the station tab arm 303b being disposed at the level of one of the inner carrier tabs 114b, 115b, 116b and 117b. The rock shaft portions of the levers which extend vertically are journaled for rotary movement in bushings 306a, 306b mounted from the track structure on a transverse track bracket 307.

Extending between the lower arms 304a, 304b, and pivotally secured thereto by pivot pins 313a, 313b, is a thrust bar 310 of a leverage system hereinafter referred to as a "whiffletree" mechanism, the thrust bar being provided with elongated slots 311, 312, in which the pivot pins operate. As so far described, it will be understood that as station tab arm 303a is actuated counterclockwise and simultaneously therewith tab arm 303b is actuated clockwise, like movement is imparted to the lower arms 304a, 304b to move thrust bar 310 ahead as a unit. In its normal position, thrust bar 310 extends relatively straight across the track and in this position levers 303a, 303b are in position to be contacted and rotated by carrier tabs having a setting corresponding to the effective height of the arms 303a, 303b.

Pivoted to draft bar 310 intermediate its ends by a king pin 314 is a push rod 315, the forward end of which is pivoted at 316 to a lever 317 fulcrumed at 318 to a fixed element below the track structure. The other or relatively inner end of lever 317 is connected to one end of a rod 319 extending to the handle 320 of unloading station hoist valve 321 generally similar to the loading station hoist valve (Fig. 23). Inasmuch as the unloading station hoists actuated by said valves are identical with the previously described loading station hoist, description of the former will not be here repeated.

A spring 322 operative between lever 317 and an element of a track supported bracket 323, in the ends of which the push rod 315 is guided, functions to urge lever 317 and hence valve handle 320 relatively to the right, in which position valve 321 connects the hoist cylinder with exhaust, such being the normal valve handle position corresponding to the low position of the elevator.

Push rod 315 extends into a spring tube 324 in which are arranged oppositely acting stiff springs 325, 326 separated by a collar 327. Said opposed springs operate through rod 315 to maintain thrust bar 310 in its normal position.

As thrust bar 310 is moved as a unit to the left (Figs. 24 and 26) due to the tabs of a carrier engaging corresponding station tab arms 303a, 303b, push rod 315 is actuated to the left to swing lever 317 counterclockwise about pivot 318, thus to move the rod 319 and valve handle 320 to the left, whereupon pressure fluid is supplied to the lower end of the hoist cylinder, thus to actuate the unloading station elevator 330 (Figs. 25 and 26) to its up position. It is here to be noted that the tab arms 303a and 303b are ineffective to cause movement of the thrust bar as aforesaid unless they are operated in unison by a pair of operatively set carrier tabs. Thus, if only one tab arm is actuated by a single carrier tab, such tab arm actuation results in thrust bar 310 turning on its king pin 314, and thus no axial movement of the thrust bar occurs as is required to actuate the unloading station elevator to its up position.

Unloading station elevator 330 is substantially like the loading station elevator 140 previously described, having a forked platform 331 and a transverse frame member 332 through which extend guide posts 333, 334 which guide the elevator platform in its vertical movement.

Secured to the transverse frame member 332 is a transversely extending bar 336 having upwardly extending end pins 337, 338. In the "up" position of the elevator, pins 337, 338 come into position (shown in dotted lines, Figs. 10 and 14) as to be engaged by trip pins 128 forming a part of the carrier tab latch mechanism, thus to turn latch bar 124 clockwise (Fig. 11) whereby to permit the tabs, following their actuation of the selected unloading station hoist valve, to return to their normal inoperative position under the influence of springs 118.

Assuming that a loaded carrier in approaching the selected unloading station has actuated the elevator at that station to its up position, further movement of the carrier across the track structure above the station automatically effects the deposition of the load on the raised elevator. This is accomplished by providing a "dip" in the track structure above the unloading station whereby the carrier loses elevation relatively of the raised elevator, and in so doing deposits its load on the elevator. Such an arrangement is indicated in Fig. 18 wherein a dip 21b is provided in the inner track 21, and dips 23b and 22b are provided in the relatively inner and outer rails of the outer track 20. The spacing between dips 21b, 22b and 23b is the same as the spacing between the track rises 21a, 22a and 23a previously described, the dips, however, resulting in the carrier losing elevation, while at the same time being maintained horizontal as it negotiates the dips, all as indicated in Fig. 18.

In the "up" position of the selected unloading station elevator 330, the top surface of platform 331 is at the approximate level assumed by the top surfaces of the carrier flanges 85, 86 when the carrier has negotiated approximately half of the dip. Accordingly, with the elevator disposed between the inner and outer tracks, the carrier deposits its load on the elevator 330 as the carrier negotiates the full depth of the track dip, the empty carrier thereupon traveling along its path of movement on the track for subsequent reloading at the loading station.

In order that the unloading station elevator 330 carrying the work box may now be lowered to the working level of that station, the carrier release bar 232 on the relatively inner side of each carrier is provided with an extension 232a which, when the unloaded carrier moves somewhat beyond the unloading station, actuates a leverage system operating to return valve handle 320 to its normal exhaust position, so that the unloading station hoist cylinder may exhaust.

This leverage system is diagrammatically illustrated in Fig. 23, in which a bellcrank 340 is illustrated as having an upper trip arm 341 which is disposed laterally of the inner track 21 to extend into the path of movement of release bar extension 232a (see Fig. 9) and a lower forked arm 342, said arms being connected by a vertical connecting shaft 343 mounted for rocking movement in a bushing carried by and sidewardly of the track structure. The forked end of the lower arm 342 straddles rod 319. On the rod is secured a stop collar 345, this collar being normally spaced from arm 342 but positioned to engage the forked end thereof as rod 319 is actuated to the end of its leftwise movement by the "whiffletree" mechanism operated by the carrier tabs. A light spring 346 having one end secured to the forked end of the arm 342 and its other end secured to a fixed member serves to hold arm 342 and hence the bellcrank assembly in its normal position in which the other or inner end of the arm 342 engages a fixed stop pin 348.

With the previously described hoist valve handle 320 maintained in its normal (full line) position as by an over-center spring 350, thus to close communication between the supply line 351 and line 352 to the related hoist cylinder, the cylinder exhausts through lines 352, 353 as hereinbefore indicated. Assuming the "whiffletree" mechanism to have actuated the valve handle to the left (dotted line position) to supply pressure fluid to the cylinder, the carrier following deposition of its load on the elevator moves past the station an amount such that release bar extension 232a engages arm 341 of the bellcrank and actuates it in counterclockwise direction. The forked end of arm 342 is turned in opposite direction against the urge of spring 346 and moves stop collar 345 in like direction. Accordingly rod 319 is actuated to the right, thus returning valve handle 320 to its normal full line position and exhausting the unloading station hoist cylinder, whereupon elevator 330 moves to its low position.

Preferably associated with each of the unloading station elevators 330 is an inclined receiving chute comprised as by spaced roller sections 360, 361 supported in inclined relation by uprights 362, 363. The spacing between roller sections 360, 361 is sufficient to accommodate the width of the elevator as indicated in Fig. 26 whereby the elevator may be moved to its low position through this space. In moving to its low position, the elevator discharges the load which has been deposited thereon onto the high end of the roller sections, the load thereupon rolling down the incline to a receiving table or like load support.

To prevent a loaded carrier as it approaches the selected receiving station from actuating the hoist valve at that station, in the event that a previously deposited work box has failed to clear the unloading station incline, the incline is provided with a pivoted arm 365, the upper end of which is adapted to be depressed by the weight of a load remaining on the roller sections 360, 361. Depression of the upper end of the arm 360 causes the lower end thereof to raise, thus to impart upward axial movement to a rod 366 pivoted to said lower end. At its upper end rod 366 is connected to one arm of a bellcrank 367, the other arm of which is connected by a link 368 with thrust bar 310 laterally of the king pin 314.

Thus, if the load (work box) has failed to clear the unloading station incline, bellcrank lever 367 is swung to its dotted line position (Fig. 25), this movement turning thrust bar 310 counterclockwise (Fig. 24) through the link connection 368. Such movement of thrust bar 310 causes the relatively outer bellcrank 300 to be turned clockwise and also the relatively inner bellcrank 301 to be turned clockwise, with the result that the station tab arms 303a, 303b are moved out of the paths traversed by the carrier tabs. Accordingly, under the conditions specified, a loaded carrier approaching the selected unloading station may pass over that station for recirculation about the track without actuating the hoist valve of the station, so that the elevator thereat remains in its low position.

As forecast in the preceding description, the loading and unloading station elevators are each actuable to "up" position by pressure fluid supplied to a fluid cylinder associated with each elevator and descending to its low position by gravity upon exhaust of the pressure fluid from said cylinder. One suggested means of generating the desired pressure of fluid for feed to the cylinders is illustrated in Fig. 1, wherein reference character 375 designates a motor-driven pump arranged at a convenient location in the plant under description, such as in the basement thereof, the inlet line 376 thereto being connected to a source of fluid under pressure such as water from a usual factory water-main 377. The outlet side of the pump is connected by a line 378 with a pressure reservoir 380, the upper part of which is filled with air under pressure from air line 381 connected with a source of factory air. Feed line 382 extends into the pressure reservoir below the water level therein and communicates with a system of piping only generally indicated at 383, 384 into which is connected the supply lines 216 and 351, respectively, to the loading station hoist valve 219 (Fig. 19) and to the unloading station hoist valves 321, one being illustrated in Fig. 23. A return line 385 connected into a system of piping, generally indicated at 386, 387 into which is connected the hoist cylinder exhaust lines 218, 353 functions to return the fluid to the return reservoir 388 into which pump inlet line 376 is connected. This system as described thus provides a pressure fluid circuit into which make-up water may be supplied from main 377.

A by-pass line 390 having connected therein a relief valve 391 set for a predetermined pressure extends between the pump outlet line 378 and the return line 385 whereby, with a continuously running pump excess water under pressure may by-pass to the inlet side of the pump as under conditions of reduced demand. The pressure air cushion maintained in reservoir 380 serves to level off fluctuations in water pressure as would otherwise occur during periods when pressure liquid is being drawn off by the station operations.

With city water available at a pressure or pressures sufficient to operate the hoist, the pump system as described may be omitted altogether and the feed line 382 to the hoist connected directly into the factory or plant water main 377. It will be understood, also, that a self-contained oil system or a pneumatic system may be employed in place of the water system as described for operation of the elevator hoists, where conditions make this type of operation necessary or advisable.

To summarize briefly the operations of a system described in the foregoing, throwing of a switch (not shown) which connects caterpillar drive motor 47 with a source of electrical energy conditions the system for operation by causing actuation of the cable drive chain 55 and hence of the tow cable 30, which latter actuates the carriers in endless succession on the track structure 10. All elevators, both at the loading station and at the plurality of unloading stations, are assumed to be in their low position following cessation of the last preceding operating period of the system.

With a plurality of loads (work boxes) available at the loading station, the operator initially actuates the station selecting means to correspond to the particular unloading station to which the loads are to be distributed by proper manipulation of the tab setting or dialing cranks 200, 201. The work boxes are now placed on the loading station incline, the lowermost box rolling down on to the loading station elevator, stop rods 272 being in low position. The weight of the boxes positioned on the intermediate roller section 260 has actuated trip lever 210 to its full line position (Fig. 21) in which it is aligned with a carrier load bar 130.

Upon the first empty carrier approaching the loading station, the load bar thereof engages trip lever 210, thereby to actuate hoist valve handle 214 to a position in which the associated valve admits pressure fluid from line 216 (supplied from line 383) through line 217 to the lower end of hoist cylinder 162. The loading station elevator with a load thereon is accordingly actuated to its up position and reaches this position prior to the arrival of the approaching carrier at the station.

As the carrier moves over the station it negotiates the track rise and accordingly picks off the load from the elevator. The selecting means carried by the elevator further actuates a pair of carrier tabs to open or operative position, the opened tabs corresponding to the selected station to which the load is to be distributed. The carrier thereupon moves away from the loading station.

The first movement of the loaded carrier away from the loading station results in release bars 231, 232 of the carrier engaging track-side release levers 234, 235, this engagement effecting actuation of valve handle 214 to its exhaust position and consequent exhaust of the hoist cylinder whereupon the loading station elevator returns to its low position.

The previous raising of the elevator resulted in the raising of the stop rods 272 of the loading station incline, thus to prevent the lowermost box of the incline from rolling off the same and also causing actuation of the box feed mechanism to advance the boxes on the incline the distance of one box. As the elevator descends as aforesaid, it depresses stop rods 272 so that the lowermost box may now roll on to the elevator. If it is intended that a succession of work boxes be sent to the same unloading station the setting of the selecting means is not disturbed. Thus the next empty carrier again calls up the elevator, picks off the load elevated thereby, has its tabs set by the selecting means to correspond to the setting of the selected station and, traveling beyond the station, effects lowering of the elevator, these operations continuing in automatic manner until the supply of loads for the particular station is exhausted.

The operator may thereupon change the setting of the station selecting means to correspond to a different unloading station, and upon loading of the boxes for the latter station on the loading station incline the system operates in automatic manner as described, with the distinction that the new setting of the selecting means actuates a different pair of carrier tabs to open or operative position. Or the operator may arrange loads destined for different unloading stations on the loading incline and obtain the necessary time for resetting the tab-setting mechanism by providing gaps between such loads sufficient to permit one or more empty carriers to pass the loading station without calling up the elevator thereof. If required, mechanism for effecting the same result mechanically may be provided, such as operator-controlled means for actuating trip lever 210 out of the path of the carrier load bars 130.

Upon the loaded carriers approaching the selected receiving station, the opened tabs thereof engage corresponding station tabs 303a, 303b (Fig. 24), whose setting or elevation is individual to that station. Actuation of the station tabs functions through the "whiffletree" mechanism in advance of the selected station to actuate the selected station hoist valve handle 320 to feed position, thus to supply pressure fluid to the lower end of the hoist cylinder at that station and hence to actuate the station elevator to its up position.

As the loaded carrier moves over the raised elevator and negotiates the track dip located at each unloading station, the load is deposited on the elevator. Further, elevator-carried pins 337, 338 function to engage the tab latch mechanism to release position whereupon the previously opened tabs now return to their closed or inoperative position.

As the carrier moves beyond the station, carrier release lug 232a engages track side trip arm 341 to return the valve to its exhaust position, whereupon the elevator and deposited load thereon descends to its low position. As the elevator descends it moves through the high end of the unloading incline and accordingly transfers its load thereto, the load rolling down the incline on to a table, belt conveyer, or the like (not shown). The empty carrier may now recirculate about the track until it again approaches the loading station whereupon, if a load is available on the loading station incline, it will call up the loading station elevator and repeat the picking up, conveying and depositing operations.

It will be understood that the setting of the station selecting means by the operator represents, with the exception of the act of loading the boxes on the loading station incline, the only manual operation necessary to the functioning of the system as described, and that all other operations are performed in automatic manner.

While in the foregoing description, only one loading station has been illustrated and referred to, it is both possible and feasible to incorporate with the system of the present invention a plurality of such loading stations whereby work may be distributed from a plurality of focal work-distributing points to any one of a plurality of work receiving stations or to a group of such stations related through the carried tabs and/or selecting means to one particular loading station.

As many changes could be made in carrying out the above construction without departing from the scope of the invention, it is intended that all matter contained in the above description or shown in the accompanying drawings shall be interpreted as illustrative and not in a limiting sense.

I claim:

1. In apparatus of the character described, the combination of an endless overhead track, an endless series of load-carriers supported on the track, the carriers each including spaced load-supporting side members and having its bottom and ends open, means for propelling the carriers along the track, a loading station including an elevator adapted when raised to position a load thereon in the path of the moving carriers and between the side members thereof, carrier-controlled mechanism for actuating the elevator to raised position, the track having an inclined rise so related to a raised elevator that the load-supporting members of a carrier negotiating the rise may engage with and lift off a load positioned thereon.

2. In apparatus of the character described, the combination of an endless track, a series of load carriers supported thereon, means for propelling the carriers along the track, the carriers being each provided with a member movable from an operative to a retracted position in response to the weight of the carrier load, a loading station including an elevator, means for actuating the elevator from a low position below the track to a raised position in the path of carrier movement, means for supplying one of a succession of loads to the elevator when the latter is in low position, and means for controlling operation of said elevator actuating means including an element normally disposed in the path of movement of the carrier members so as to be engaged thereby when the latter are in their operative position, and means for moving said element out of the path of the carrier members upon the supply of loads being exhausted.

3. In apparatus of the character described, the combination of an endless track, a series of load carriers supported thereon, means for propelling the carriers along the track, a carrier loading station including an elevator movable from a low position to a raised position in the path of carrier movement, means including a reciprocating member for actuating the elevator to raised position, an incline providing a support for a plurality of loads for supply to the elevator when the latter is in low position, means responding to the approach of an empty carrier to the loading station for operating the elevator actuating means, and means operable from and responsive for its actuation to the movement of said reciprocating member for imparting predetermined movement in the direction of the elevator to the loads supported on the incline.

4. In apparatus of the character described, the combination of an endless track, a series of load carriers supported thereon, means for propelling the carriers along the track, a carrier loading station, a carrier unloading station including an elevator movable from a low position to a raised position in the path of carrier movement, means normally effective upon the approach of a loaded carrier destined for the unloading station to actuate the elevator to raised position, a load discharge chute associated with said elevator, the carrier being operative to deposit its load on the raised elevator during its travel over the same upon the carrier moving over the raised elevator, means operative following load deposition to effect return movement of the elevator to its low position, during which the elevator transfers the load to the discharge chute, and means rendering said elevator actuating means ineffective upon failure of a load previously transferred to the discharge chute to clear the same.

5. In apparatus of the character described, the combination of a track, a series of load-carriers supported on said track, means for propelling the carriers along the track, loading and unloading stations, each unloading station including load-receiving means actuable to a predetermined position in the path of movement of the carriers, normally ineffective means for actuating said receiving means to such position including a pair of station elements located in advance of said unloading station, the station elements of a pair being mounted both for movement together when engaged by the carrier destined for said unloading station and for movement independently of each other, means requiring that the elements of a pair move together and in predetermined manner for rendering said actuating means effective, said last means including a member mounted both for pivotal movement about an axis intermediate its ends and for shifting movement as a unit, and connections between the station elements of a pair and the ends of said member.

6. In apparatus of the character described, the combination of a track, a series of load-carriers supported on said track, means for propelling the carriers along the track, loading and unloading stations, each unloading station including load-receiving means actuable to a predetermined position in the path of movement of the carriers, normally ineffective means for actuating said receiving means to such position including a pair of station elements located in advance of said unloading station, the station elements of a pair being mounted both for movement together when engaged by the carrier destined for said unloading station and for movement independently of each other, and means requiring that the elements of a pair move together and in predetermined manner for rendering said actuating means effective, said last means including a first member mounted both for pivotal movement about an axis intermediate its ends, connections between the station elements of a pair and the ends of said member, and a second member mounted for axial movement in response to shifting movement of the first member.

7. In a conveyer system, the combination of a track, a continuously driven load-conveying carrier traveling thereon, the carrier having load supporting members operative to support a load along its sides, a loading station including means responsive to the approach of an empty carrier thereto for stationarily positioning a load to be conveyed in the path of carrier travel and at a fixed level above that of the load supporting members of said carrier, the track being so constructed that, upon the carrier traveling to a predetermined position in which its load supporting members are disposed beneath a load positioned as aforesaid, it causes said carrier to raise and its load supporting members to engage and lift the load from the load positioning means.

8. In a conveyer system, the combination of a track, a continuously driven load-conveying carrier traveling thereon, the carrier having load supporting members operative to support a load along its sides, a loading station including means responsive to the approach of an empty carrier thereto for stationarily positioning a load to be conveyed in the path of carrier travel and at a fixed level above that of the load supporting members of said carrier, the track having a rise operative, upon the carrier traveling to a predetermined position in which its load supporting members are disposed beneath a load positioned as aforesaid, to raise said carrier until its supporting members engage and lift the load from the load positioning means.

9. In a conveyer system, the combination of a track, a continuously driven load-conveying carrier traveling thereon, the carrier having load supporting members operative to support a load along its sides, a loading station including an elevator having a normal low position and being actuable to a raised position in which it is adapted to stationarily position a load to be conveyed in the path of carrier travel and at a fixed level above that of the supporting members of the carrier when approaching the station, means responding to the approach of an empty carrier for actuating the elevator to its raised position, the track having a rise operative, upon the carrier traveling to a predetermined position in which its load supporting members are disposed beneath a load positioned as aforesaid, to raise the carrier until said members engage and lift the load from the raised elevator, and means responsive to the travel of the loaded carrier past the station for returning the elevator to its low position.

10. In a conveyer system, the combination of a track, a continuously driven load-conveying carrier traveling thereon, the carrier having load supporting members operative to support a load along its sides, an unloading station including load receiving means adapted to be stationarily positioned in the path of carrier travel and at a fixed level below that of the load supporting members of the carrier when approaching the station, means responding to the approach of the carrier containing a load destined for said station to actuate the receiving means to its position aforesaid, the track being so constructed that, upon travel of said carrier to a predetermined position in which the load supporting members and the load supported thereby are disposed above the receiving means, it causes the carrier to lower and thereby deposit its load on the load receiving means.

11. In a conveyer system, the combination of a track, a continuously driven load-conveying carrier traveling thereon, the carrier having load supporting members operative to support a load along its sides, an unloading station including load receiving means adapted to be stationarily positioned in the path of carrier travel and at a fixed level below that of the load supporting members of the carrier when approaching the station, means responding to the approach of the carrier containing a load destined for said station to actuate the receiving means to its position aforesaid, the track having a dip operative, upon travel of said carrier to a predetermined position in which its load supporting members and the load supported thereby are disposed above the receiving means, to cause the carrier to lower until it deposits its load on the load receiving means.

12. In a conveyer system, the combination of a track, a continuously driven load-conveying carrier traveling thereon, the carrier having load supporting members operative to support a load along its sides, an unloading station including an elevator having a normal low position and being actuable therefrom to a raised position in which it is disposed at a fixed level below that of the supporting members of the carrier when approaching the station, means responding to the approach of the carrier containing a load destined for said station to actuate the elevator to its raised position aforesaid, the track having a dip operative, upon travel of said carrier to a predetermined position in which its load supporting members and the load supported thereby are disposed above the elevator, to cause the carrier to lower until it deposits its load on the elevator, and means responsive to the travel of the emptied carried past said station for returning the elevator to its low position.

13. In a conveyer system, the combination of a track, a plurality of continuously driven load-conveying carriers traveling thereon, the carriers being each provided with load supporting members operative to support a load along its sides, a loading station and a plurality of unloading stations, the loading station including means responding to the approach of an empty carrier thereto for stationarily positioning a load to be conveyed in the path of carrier travel and at a fixed level which is above that of the load supporting members of said carrier, each unloading station including load receiving means adapted, responsively to the approach of a carrier bearing a load destined thereto, to be stationarily positioned in the path of carrier travel and at a fixed level which is below that of the load supporting members of said approaching carrier, the track being provided with a rise so located with reference to the load positioning means as to cause the approaching empty carrier to raise until its load supporting members engage and lift off a load from the latter and with dips so located with reference to the load receiving means as to cause a carrier bearing a load destined to any one unloading station to lower and deposit its load on the stationarily positioned receiving means thereof.

14. In a conveyer system, the combination of a track, a plurality of continuously driven load-conveying carriers traveling thereon, the carriers being each provided with load supporting members adapted to support a load along its sides, a loading station and a plurality of unloading stations, the loading station including an elevator having a normal low position and being actuable to a raised position of fixed level which is higher than that of the load receiving members of carriers traveling on the approach side of the station, means responding to the approach of an empty carrier for actuating the elevator to its raised position, and means responding to travel of said carrier past the station for returning said elevator to its low position, each unloading station including an elevator having a normal low position and being actuable to a raised position of fixed level which is lower than that of the supporting members of carriers traveling on the approach side of said station, means responding to the approach of a carrier bearing a load destined to any one of the unloading stations for actuating the elevator of that station to raised position, and means responding to travel of an emptied carrier past that station for returning the elevator to low position, the track having adjacent the loading station a rise which is so located with reference to the elevator thereof when in its raised position as to cause the carrier to raise until its supporting members engage and lift off a load therefrom, and with a dip adjacent each unloading station which is so located with reference to the elevator thereof when in raised position as to cause the carrier to lower until it deposits its load on said raised elevator.

15. In a conveyer system, the combination of a track, a plurality of continuously driven load-conveying carriers traveling thereon, the carriers each having load supporting members operative to support a load along its sides, a loading station and a plurality of unloading stations, the loading station including means for supplying loads to empty carriers passing the same, and means for selecting the unloading stations to which loads supplied to said carriers are destined, each of said unloading stations including load receiving means adapted to be stationarily positioned in the path of carrier travel and at a fixed level which is below that of the load supporting members of carriers traveling on the approach side of said station, the track adjacent each unloading station being provided with a dip operative to cause lowering of a carrier negotiating the same until it deposits a load supported therein on the load receiving means of said station when the latter is positioned at its fixed level aforesaid, and means responding to the approach to a selected unloading station of a carrier bearing a load destined thereto for actuating the load receiving means of that station to its fixed level as aforesaid.

16. In a conveyer system, the combination of a track, a plurality of continuously driven load-conveying carriers traveling thereon, the carriers each having load supporting members operative to support a load along its sides, a loading station and a plurality of unloading stations, the loading station including means for supplying loads to empty carriers passing the same, and means for selecting the unloading stations to which loads supplied to said carriers are destined, each of said unloading stations including an elevator having a normal low position and being actuable to a raised position in the path of carrier travel and at a fixed level which is lower than that of the load supporting members of carriers traveling on the approach side of said station, the track adjacent each unloading station having a dip operative to cause lowering of a carrier negotiating the same until it deposits a load supported therein on the elevator of that station when the latter is in its raised position, and means responding to the approach to a selected unloading station of a carrier bearing a load destined thereto for actuating the elevator thereof to raised position.

17. In a conveyer system, the combination of a track, a plurality of continuously driven load-conveying carriers traveling thereon, the carriers each having load supporting members operative to support a load along its sides and having mounted on each side thereof a plurality of tabs adapted to be set to operative position, a loading station and a plurality of unloading stations, said loading station including an elevator adapted in response to the approach thereto of an empty car to be actuated to a raised load transfer position in the path of carrier travel in which it is stationarily maintained until the carrier travels past said station, and a mechanically operable selecting device for setting certain of the carrier tabs in correspondence with the unloading stations to which loads transferred to the carriers are destined, the unloading stations each including an elevator adapted in response to the approach of a carrier bearing a load destined thereto to be actuated to a raised load receiving position in the path of carrier travel in which it is stationarily maintained until said carrier travels past said station, means for actuating said elevator to its load receiving position, and control means therefor including station elements individual to the station for engagement by carrier tabs set in correspondence therewith, the track being so constructed as to cause the carriers to pick up ready loads from the raised elevator of the loading station and to deposit their loads on the raised elevators of the selected receiving stations.

SAMUEL LIPPINCOTT GRISWOLD KNOX.